Dec. 24, 1929.                G. KUHLMAN                 1,740,772
                            HINGE FOR REAR GATES
                          Filed Sept. 8, 1927        2 Sheets-Sheet 1
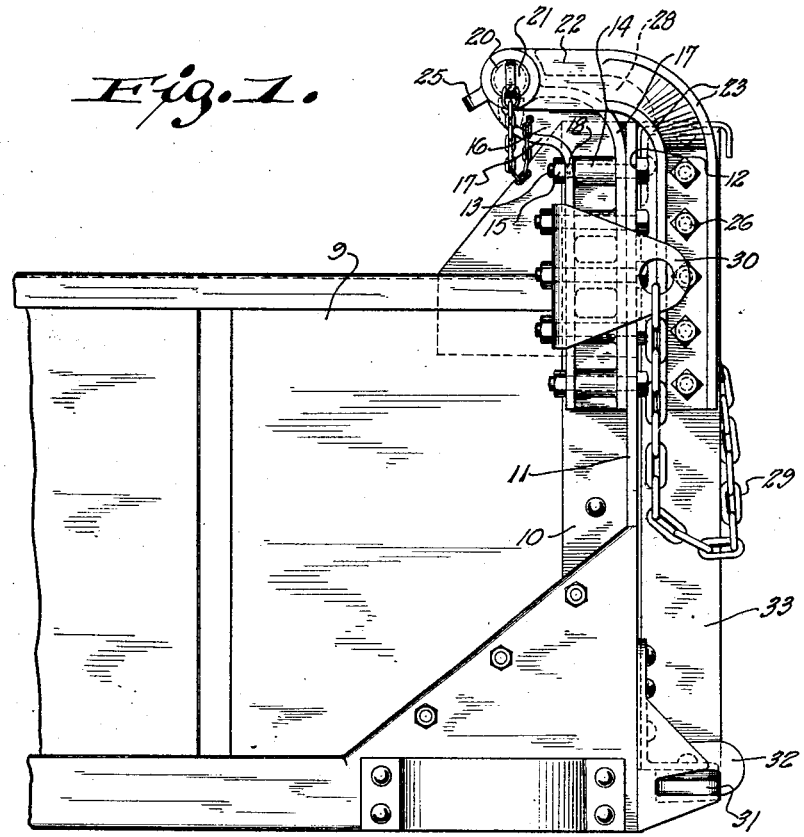
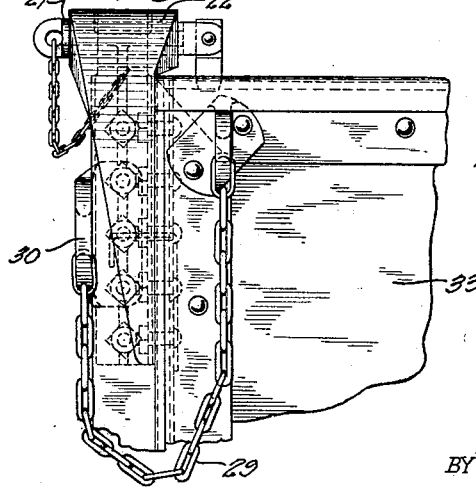
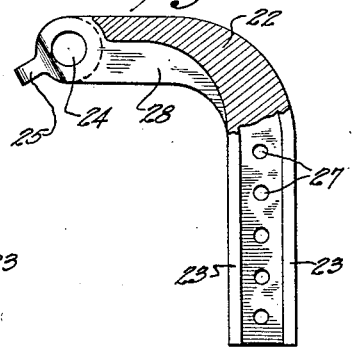
INVENTOR
George Kuhlman.
BY
Morsell, Keeney & Morsell
ATTORNEYS Dec. 24, 1929.        G. KUHLMAN        1,740,772
HINGE FOR REAR GATES
Filed Sept. 8, 1927        2 Sheets-Sheet 2
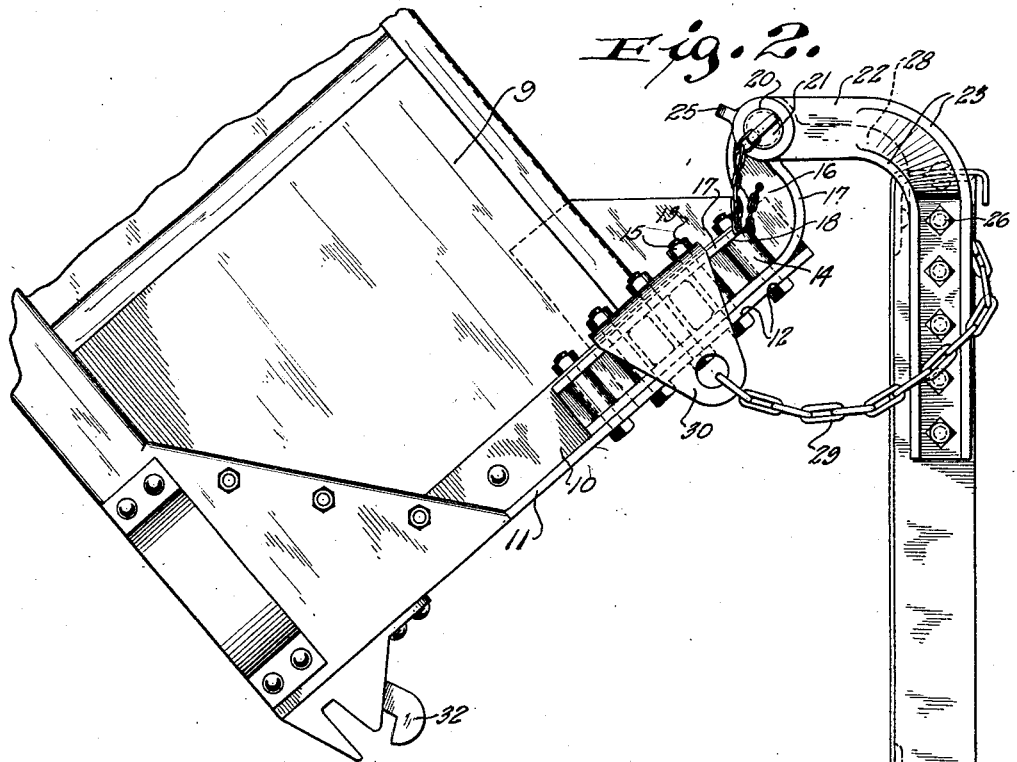
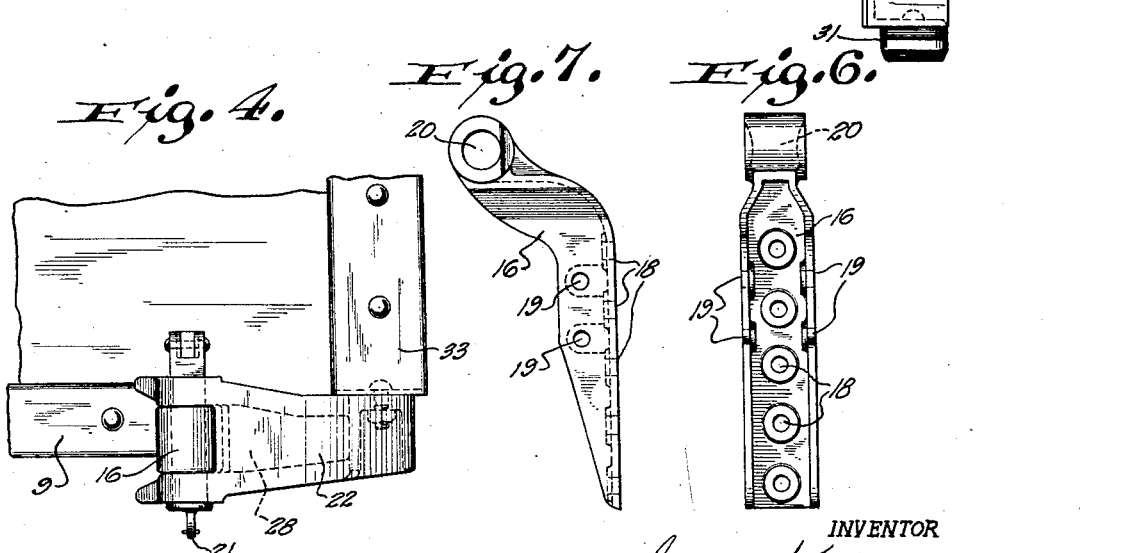
INVENTOR
George Kuhlman.
BY
Morsell, Keeney & Morsell,
ATTORNEYS.

Patented Dec. 24, 1929

1,740,772

UNITED STATES PATENT OFFICE

GEORGE KUHLMAN, OF LONG ISLAND CITY, NEW YORK, ASSIGNOR TO THE HEIL CO., OF MILWAUKEE, WISCONSIN, A CORPORATION OF WISCONSIN

HINGE FOR REAR GATES

Application filed September 8, 1927. Serial No. 218,262.

This invention relates to improvements in hinges for rear gates, adapted to be used on truck or wagon bodies, and more particularly on bodies which are of the tiltable type so as to permit emptying of their contents when desired.

It is one of the objects of the present invention to provide a hinge for truck rear gates which will allow a greater angle of opening than is possible in the usual type of rear gate.

It is a further object of the invention to provide a hinge for rear gates which is more substantial than the hinges commonly provided and which will therefore withstand the great strain to which it is subjected.

It is a more specific object of this invention to provide a hinge for rear gates which is formed by castings extending upwardly and inwardly from the rear of the truck body to accomplish the aforementioned purpose of providing a greater angle of opening.

It is a further object of this invention to provide a hinge for rear gates which is simple in construction and which is well adapted for the purpose described.

With the above and other objects in view, the invention consists of the improved hinge for rear gates, and all its parts and combinations as set forth in the following description and in the claims and all equivalents thereof.

In the accompanying drawing, in which the same reference characters designate the same parts in all of the views:

Fig. 1 is a side elevation of the improved hinge for rear gates, showing the device in combination with a truck body, part of the body being broken away;

Fig. 2 is a similar view showing a portion of the truck body in a tilted position, and the rear gate in an open position;

Fig. 3 is a view of one of the hinges as it appears from the rear of a truck, portions of the tail gate being broken away;

Fig. 4 is a top view of one of the hinges, as applied to a truck, portions of truck body and tail gate being broken away;

Fig. 5 is a side view of the rear gate hinge casting, part being shown in section to illustrate the pocket in the lower portion of the bent end;

Fig. 6 is a rear view of a modified form of the body hinge casting; and

Fig. 7 is a side view thereof.

Referring to the drawing, the numeral 9 designates a truck body, the rear of which is provided on each side with vertical end members 10 extending above the sides of the truck body. These end members are formed on the outer side with a flange 11 having perforations 12. Secured to said vertical supports by bolts 13 having central collars 14 and nuts 15, said bolts extending through the perforations 12, are body hinge members 16. These body hinge members are formed preferably with a flange 17 on each side, having bolt receiving perforations 18. In the modified form of casting shown in Figs. 6 and 7, there is a flange on one side only, there are additional bolt perforations 19, and there is a tapered lower end portion. The hinge member 16 has its upper portion bent inwardly and upwardly as shown. The upper end of the body hinge is formed with a flanged opening 20. Secured to the body hinge 20 by a pin 21 is a rear gate hinge member 22 which has flanges 23 and an inwardly bent upper end portion. Said member is best illustrated in Fig. 5. Its upper end is bifurcated, only one portion being shown in Fig. 5. The bifurcated end is formed with openings 24 and lugs 25. Said bifurcated end portion embraces both sides of the end of the hinge 16 (see Fig. 4) and the pin 21 extends through the openings in each member to form the hinged connection. The rear gate hinges 22 are secured to each side of the rear gate by bolts 26 extending through perforations 27. The inwardly bent end portion of the hinge 22 is formed with a pocket 28 in which the upper portion of the hinge 16 is received when the rear gate 33 is closed. The rear gate is also provided with a stop chain 29, one end of which is secured to the rear gate, and the other end of which is attached to a chain securing plate 30 which is held in place by the nuts 15 and bolts 13. The lower portion of the rear gate is provided with a lug 31 adapted to engage a latch 32 on the body when the rear gate is closed.

Assuming the rear gate to be in the position shown in Fig. 1, when it is desired to empty the contents of the truck body, the body is tilted as illustrated in Fig. 2. When the latch 32 is released, the rear gate will swing by gravity to the open position.

From the foregoing description it may be seen that the improved hinge for rear gates is strong and durable, is simple in construction, and is well adapted for the purpose described.

What I claim is:

1. The combination with a truck body having end members extending above the sides of the truck body, of inwardly bent hinge members secured to the end members, a rear gate, and inwardly bent hinge members each having a recess opening downwardly to form a pocket, said last hinge members being secured to said rear gate and in pivotal connection with the body hinge members, said pockets being adapted to receive the upper portions of the body hinge members and said rear gate hinge members thereby fitting above and in front of the body hinge members when the rear gate is closed.

2. The combination with a truck body having end members extending above the sides of the truck body, of inwardly bent hinge members secured to the end members and each hinge member having an opening in its upper end portion; a rear gate; inwardly bent hinge members secured to the rear gate, each hinge member being formed with a bifurcated end portion having openings therein, and also having a recess opening downwardly to form a pocket, said pockets being adapted to receive the upper portions of the body hinge members and said rear gate hinge members thereby fitting above and in front of the body hinge members when the rear gate is closed; and a pin extending through the openings in the end portions of the hinge members to form a pivotal connection.

3. The combination with a truck body having end members extending above the sides of the truck body, of inwardly bent hinge members secured to the end members and each hinge member having an opening in its upper end portion; a rear gate; inwardly bent hinge members secured to the rear gate, each hinge member being formed with a bifurcated end portion having openings therein, and also having a recess opening downwardly to form a pocket, said pockets being adapted to receive the upper portions of the body hinge members and said rear gate hinge members thereby fitting above and in front of the body hinge members when the rear gate is closed; a pin extending through the openings in the end portions of the hinge members to form a pivotal connection, a latch secured to the lower portion of the body, and a lug on the rear gate for engagement with said latch to hold the gate in the closed position.

4. The combination with a truck body having inwardly bent end members extending above the sides of the truck body, of a rear gate, and inwardly bent hinge members each having a recess opening downwardly to form a pocket, said hinge members being secured to said rear gate and being in pivotal connection with the body end members, said pockets being adapted to receive the upper portions of the body end members and said rear gate hinge members thereby fitting above and in front of the body hinge members when the rear gate is closed.

5. The combination with a vehicle body having inwardly bent end members, of a rear gate having inwardly extending hinge portions each having a recess opening downwardly to form a pocket, said hinge portions being in pivotal connection with the body end members, and said pockets being adapted to receive the upper portions of the body end members and said rear gate hinge members thereby fitting above and in front of the body hinge members when the rear gate is closed.

In testimony whereof, I affix my signature.

GEORGE KUHLMAN.